Sept. 23, 1969  J. W. MACIELINSKI  3,468,171
FLEXIBLE SEALS
Filed Sept. 11, 1967
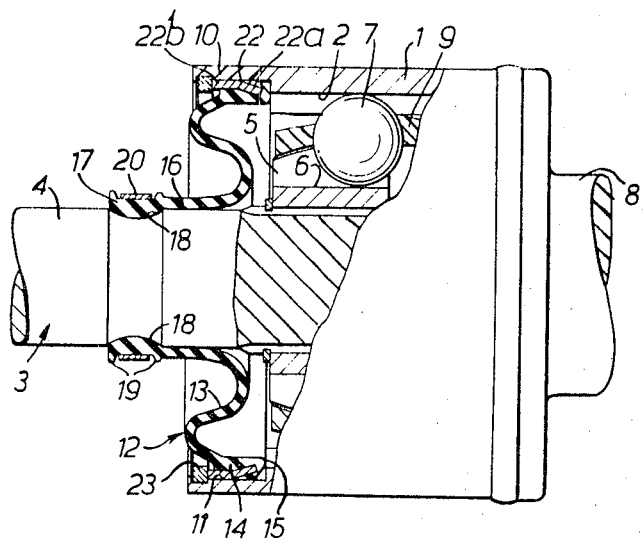
INVENTOR
JERZY WITOLD MACIELINSKI
BY Young + Thompson
ATTORNEYS United States Patent Office 3,468,171
Patented Sept. 23, 1969

3,468,171
FLEXIBLE SEALS
Jerzy Witold Macielinski, Birmingham, England, assignor to Birfield Engineering Limited, London, England
Filed Sept. 11, 1967, Ser. No. 666,599
Claims priority, application Great Britain, Sept. 16, 1966, 41,383/66
Int. Cl. F16j 15/50
U.S. Cl. 74—18.1         11 Claims

ABSTRACT OF THE DISCLOSURE

A flexible seal for fitting to an inner shaft member and an external member by which the shaft member is surrounded, these members conveniently being components of a universal joint. When fitted the seal retains lubricant and prevents dirt entering between the members with the flexibility of the seal accommodating relative movement of the members. The seal comprises a flexible wall with an inner periphery formed for attachment around the shaft member, and an outer periphery with a thickened rim portion which fits within and seals against the member. A metal reinforcing ring is partially embedded in the outer rim and projects therefrom for engagement with the member and/or an axially-locating surface.

---

This invention relates to flexible seals of the type which are fitted to an inner shaft member and an external member by which it is surrounded, such a seal when fitted serving to retain lubricant and prevent dirt and other foreign matter entering between the members while the flexibility of the seal accommodates relative movement of the members.

Seals of the foregoing type are commonly fitted, for example, to universal joints embodied in propeller and drive shafts of motor vehicles and the invention is of particular, though by no means exclusive, application to a so-called "diaphragm seal" for a constant velocity universal joint in a motor vehicle transmission system. Diaphragm seals of this nature comprise a flexible wall which is normally somewhat convoluted to accommodate angularity of the inner and outer joint members and which at inner and outer peripheries is respectively formed for attachment to the joint members in two closely spaced planes.

According to the invention a flexible seal comprises a flexible wall with an inner periphery formed for attachment to an inner shaft member which it then surrounds and an outer periphery formed with a thickened rim portion to fit within and seal against an outer member which surrounds the shaft member, a metal reinforcing ring being partially embedded in the outer rim and projecting therefrom for engagement with the outer member and/or an axially-locating surface.

The reinforcing ring may consist of an inwardly directed frusto-conical end section embedded in the rim and an adjoining section designed to be a press fit in the outer member, and the end face of the latter section may be arranged to abut a circlip let into the outer member for location purposes and providing said locating surface. The section of the reinforcing ring which is a press fit in the outer member may be cylindrical, but for ease of removal it may alternatively have a slight taper the angle of which is much less than the cone angle of said frusto-conical section, say of 2° or 3°. Axial location in the opposite direction may be provided by a step in the outer member engaged by the seal rim. The seal will normally be moulded from an elastomeric material such as rubber.

The invention will now be further described with reference to the accompanying drawing which shows, by way of example and partly in axial cross-section, a constant velocity universal joint fitted with a diaphragm seal in accordance with the invention.

The joint is of generally conventional form and comprises an outer joint member 1 of hollow cylindrical shape with internal longitudinal grooves 2. The inner shaft member 3 has a shaft portion 4 which projects from an open end of the outer member 1 and a part-spherical end portion 5 formed with external longitudinal grooves 6, the grooves 2 and 6 in the two members 1 and 3 respectively cooperating in pairs, with each pair engaged by a torque-transmitting ball 7 which accommodates changing angularity of the members 1 and 3. Relative axial movement or "plunge" of the members 1 and 3 is also accommodated by the balls 7 which roll along the respective grooves 2 and 6. The other end of the outer member 1 is closed and connected to a drive shaft member 8. Ball positioning to maintain constant velocity joint characteristics is obtained in the usual manner by means of a ball cage 9.

As compared with the normal construction the outer member 1 has a short extension 10 at the open end, and this extension is internally counterbored at 11 to accommodate the outer periphery of the sealing member 12. The latter is moulded from rubber with a flexible wall 13 which is of convoluted form, being generally sinusoidal in radial cross-section. At the outer periphery the sealing member 12 has a thickened rim 14 which fits in the counterbore 11 and has an end face 15 which abuts the step at the inner end of the counterbore 11 to provide axial location in one direction and sealing engagement.

At the inner periphery the sealing member 12 has a generally tubular section 16 directed in the opposite direction to the rim 14, i.e. away from the outer joint member 1, and which terminates in a thickened end section 17 fitting closely in an annular groove 18 of arcuate section machined in the inner shaft member 3 just outside but closely adjacent the open end of the outer joint member 1. Thus the flexible wall 13 is housed within the counterbore 11 and is disposed generally symmetrically with respect to a diametral plane of the joint in the condition of zero angularly, i.e. with the rotational axes of the inner and outer joint members 1 and 3 aligned as in the drawing. This arrangement provides maximum stability with respect to centrifugal forces during joint rotation. The thickened inner end section 17 has two parallel projecting external annular ribs 19 between which fits a reusable band 20 of relatively hard rubber or similar material which holds the sealing member 12 firmly in position on the inner joint member 3.

An annular metal reinforcing ring 22 is partially embedded in the outer rim 14 of the sealing member 12. The ring 22 consists of a frusto-conical inwardly directed end section 22a which is embedded in the rim 14 and faces into the outer member 1, and a cylindrical or slightly tapering section 22b which projects from the rim 14 and is an interference fit and seats within the counterbore 11. If it has a slight taper, which may be of the order of 2° or 3°, the section 22b is of increasing diameter outwardly of the counterbore 11, i.e. towards the left-hand end as shown in the drawing. When the ring 22 has been pressed into the outer joint member 1 it is retained by a circlip 23 let into the member 1 adjacent the open end thereof and which bears on the end face of the ring 22 with a slight axial interference to ensure a good seal, the end face 15 of the rim 14 being pressed against the step at the inner end of the counterbore 11.

In prior forms of disaphragm seal used with constant velocity universal joints of the type described it has been usual for the outer periphery of the sealing member to fit externally around the outer joint member and be held in position thereon by a crimped metal band. The present embodiment, in which the sealing member 12 fits within the outer joint member 1, has the advantage that the overall outer diameter of the assembly is considerably reduced, which in some cases materially assists installation. A further advantage is ease of assembly as the retaining circlip 23 is much easier to fit reliably than the previous outer crimped metal band. The circlip 23 is also reusable so that replacement of the sealing member 12 in service is very much simplified and cheapened, fitting of a new crimped band sometimes being extremely difficult in a cramped installation.

I claim:

1. A flexible seal for fitting between an inner shaft member and an outer member which surrounds the shaft member, the seal comprising a flexible wall with an inner periphery formed for attachment to the inner shaft member which it then surrounds and an outer periphery formed with a thickened rim portion to fit within and seal against the outer member, and a metal reinforcing ring which is partially embedded in the outer rim portion and projects therefrom for engagement with the outer member.

2. A flexible seal according to claim 1, wherein the reinforcing ring consists of an inwardly directed frustoconical end section embedded in the rim and an adjoining section designed to be a press fit in the outer member.

3. A flexible seal according to claim 2, wherein said adjoining section of the reinforcing ring is cylindrical.

4. A flexible seal according to claim 2, wherein said adjoining section of the reinforcing ring has a slight external taper.

5. A flexible seal according to claim 1, wherein the flexible wall between the inner periphery and the thickened rim portion of the seal is of convoluted form.

6. A flexible seal according to claim 5, wherein the flexible wall is generally sinusoidal in radial cross-section.

7. A flexible seal according to claim 1, wherein the inner periphery is in the form of a generally tubular section directed in the opposite direction to the thickened rim portion.

8. A flexible seal according to claim 7, wherein the inner periphery terminates in a thickened end section adapted to locate in an annular groove formed in the inner shaft member.

9. A flexible seal according to claim 7, wherein said thickened end section has two parallel projecting external annular ribs between which may be fitted a band to hold the seal firmly in position on the inner shaft member.

10. A flexible seal according to claim 1, and moulded from an elastomeric material such as rubber.

11. A flexible seal for fitting between an inner shaft member and an outer member which surrounds the shaft member, the seal comprising a flexible wall with an inner periphery formed for attachment to the inner shaft member which it then surrounds and an outer periphery formed with a thickened rim portion to fit within and seal against the outer member, and a metal reinforcing ring which is partially embedded in the outer rim and projects therefrom for engagement with an axially locating surface on a retaining member fitted to the outer member.

References Cited

UNITED STATES PATENTS

| | | | |
|---|---|---|---|
| 2,323,569 | 7/1943 | Rzeppa | 74—18.1 XR |
| 2,510,362 | 6/1945 | Anderson | 74—18.1 XR |
| 3,029,617 | 4/1962 | Marquis et al. | 64—8 |
| 3,176,476 | 4/1965 | Cull | 64—21 XR |
| 3,208,290 | 9/1965 | Mathues et al. | 74—18.1 |

FRED C. MATTERN, Jr., Primary Examiner

F. D. SHOEMAKER, Assistant Examiner

U.S. Cl. X.R.

57—157